United States Patent
Bouru et al.

(10) Patent No.: US 8,827,653 B2
(45) Date of Patent: Sep. 9, 2014

(54) UNDUCTED FAN WITH VARIABLE-PITCH BLADES FOR A TURBINE ENGINE

(75) Inventors: Michel Andre Bouru, Montereau sur le Jard (FR); Laurent Jablonski, Melun (FR); Philippe Joly, Vaux le Penil (FR); Eric Jacques Boston, Cesson (FR)

(73) Assignee: Snecma, Paris (FR)

( * ) Notice: Subject to any disclaimer, the term of this patent is extended or adjusted under 35 U.S.C. 154(b) by 535 days.

(21) Appl. No.: 13/258,481

(22) PCT Filed: Feb. 23, 2010

(86) PCT No.: PCT/FR2010/000167
§ 371 (c)(1),
(2), (4) Date: Oct. 28, 2011

(87) PCT Pub. No.: WO2010/109085
PCT Pub. Date: Sep. 30, 2010

(65) Prior Publication Data
US 2012/0045334 A1    Feb. 23, 2012

(30) Foreign Application Priority Data
Mar. 23, 2009 (FR) .................................. 09 01344

(51) Int. Cl.
*F01D 7/00* (2006.01)
*F16C 19/16* (2006.01)
*F16C 35/073* (2006.01)
*B64C 11/48* (2006.01)
*B64C 11/06* (2006.01)
*F16C 23/06* (2006.01)
*B64D 27/02* (2006.01)

(52) U.S. Cl.
CPC ............... *B64C 11/06* (2013.01); *F16C 19/163* (2013.01); *Y02T 50/66* (2013.01); *B64D 2027/026* (2013.01); *F16C 35/073* (2013.01); *B64C 11/48* (2013.01); *F16C 23/06* (2013.01)
USPC ...................................................... 416/204 R

(58) Field of Classification Search
CPC ....................................................... F01D 7/00
USPC ............... 415/160; 416/128, 129, 147, 204 R
See application file for complete search history.

(56) References Cited

U.S. PATENT DOCUMENTS 2,248,590 A    7/1941   Smith
3,985,406 A * 10/1976   Baron ........................... 384/618

(Continued)

FOREIGN PATENT DOCUMENTS

DE           92 06 149        7/1992

OTHER PUBLICATIONS

International Search Report issued Jun. 9, 2010 in PCT/FR10/000167 filed Feb. 23, 2010.

(Continued)

*Primary Examiner* — Ned Landrum
*Assistant Examiner* — Liam McDowell
(74) *Attorney, Agent, or Firm* — Oblon, Spivak, McClelland, Maier & Neustadt, L.L.P.

(57) ABSTRACT

A non-streamlined propeller including blades with a variable setting for a turbine engine, the blades of the propeller being rotatably mounted about the axes thereof in radial recesses of a rotor element, and each blade being supported by a plate held in a recess by a sectored ring, and including an inner portion mounted, by interlocking, in a groove of the plate, the ring sectors being inserted into the recess from the inside and locked by a nut screwed onto the plate.

11 Claims, 3 Drawing Sheets

(56) References Cited

U.S. PATENT DOCUMENTS

| | | | |
|---|---|---|---|
| 4,082,378 A | * | 4/1978 | Gries .......................... 384/447 |
| 4,762,466 A | * | 8/1988 | Bouiller et al. .............. 416/205 |
| 4,863,352 A | * | 9/1989 | Hauser et al. ............. 416/204 R |
| 5,051,693 A | | 9/1991 | Brauer |
| 5,263,898 A | | 11/1993 | Elston, III et al. |
| 2010/0239421 A1 | | 9/2010 | Boston et al. |

OTHER PUBLICATIONS

U.S. Appl. No. 13/382,026, filed Jan. 3, 2012, Boston, et al.

U.S. Appl. No. 13/389,031, filed Feb. 6, 2012, Boston, et al.

* cited by examiner

UNDUCTED FAN WITH VARIABLE-PITCH BLADES FOR A TURBINE ENGINE

This invention relates to a fan with variable-pitch blades for a turbine engine of the type comprising an unducted fan (or open rotor).

A turbine engine of this type comprises two external coaxial and contra-rotating fans, respectively upstream and downstream, which are each driven in rotation by a turbine of the turbine engine and which extend substantially radially to the exterior of the nacelle of this turbine engine.

Each fan comprises a polygonal rotor element comprising substantially radial cylindrical recesses distributed around the longitudinal axis of the turbine engine and wherein are mounted plates for supporting blades of the fan. Each blade comprises for example a foot with a dovetail section which is inserted into a groove of complementary shape of the plate.

In the current technique, each plate comprises a substantially cylindrical body screwed into a cylindrical ring which is centred and guided in rotation in a recess of the rotor element by means of thrust bearings.

The plates and the rings can rotate in the recesses of the rotor element and are driven in rotation around the axes of the blades by suitable means in such a way as to adjust the angular setting of the blades, and to optimise according to the operating conditions of the turbine engine.

During operation, the blades of the fan are subjected to very substantial centrifugal forces which can reach 30,000 daN, these forces being transmitted to the rotor element by means of plates, rings and thrust bearings and passing through the screw threads of the plates in the rings. These threads are in general not designed to transmit such forces and risk deteriorating rapidly, as such limiting the lifespan of the fan.

The invention in particular has for objective to provide a solution that is simple, effective and economical to this problem.

It has for object a fan of the aforementioned type wherein the transmission of the forces between each blade support plate and its ring is provided by annular surfaces for pressing which are relatively substantial, not by threads which are relatively fragile.

It proposes to this effect an unducted fan with variable-pitch blades for a turbine engine, the blades of the fan being rotatably mounted about the axes thereof in radial recesses of an annular rotor element and each blade being supported by a plate with a cylindrical body which is inserted from the outside into a radial recess of the rotor element and which is held by an annular ring mounted from the inside in the recess and applied on an inner edge of the recess by means of a bearing, characterised in that the ring is sectorized and comprises a radially inner portion mounted by interlocking of the ring sectors in an annular groove of the outer surface of the body of the plate.

According to the invention, the body of each blade support plate is held in a recess of the rotor element by a sectorized ring which is interlocked in an annular groove of the body of the plate and which is applied onto an inner edge of the recess of the rotor element by means of a bearing, in such a way that the centrifugal forces applied to the blade during operation are taken up by the portion of the ring interlocked in the groove of the plate and transmitted by the bearing to the rotor element. This makes it possible to increase in a notable manner the lifespan of the fan.

According to another characteristic of the invention, the sectorized ring is formed of two, three, or four ring sectors, and even more, which are interlocked on the body of the plate as follows. The body of the plate is inserted into the recess of the rotor element from the outside, by displacement of the plate in translation along the axis of the recess. Each ring sector is inserted into the recess from the inside, between the body of the plate and an inner cylindrical surface of the recess, via translation along the axis of the recess, until it is located on the annular groove of the body of the plate. Each sector is then displaced in radial translation (in relation to the axis of the recess) from the exterior towards the interior in such a way that its inner portion interlocks in the outer groove of the body of the plate. The ring is then held in the radial direction on the plate by the pressing of the flanks of its inner portion on the inner lateral walls of the groove of the plate. The aforementioned inner portion of the ring can be formed by an inner annular edge.

The ring can comprise two sectors each having an angular extent of approximately 180°, or three sectors each having an angular extent of approximately 120°, or four sectors each having an angular extent of approximately 90°.

The annular portion of the ring is advantageously inserted into the annular groove of the body of the plate with an adjustment with a very low assembly tolerance.

The ring sectors are moreover locked in the groove of the body of the plate via locking means fixed on the body of the plate from the inside of recess.

In an embodiment of the invention, the ring comprises a tapered outer surface that widens towards the exterior and whereon is applied an inner tapered surface substantially complementary of a ring which is inserted from the inside into the recess and which is solicited on the ring by a nut screwed onto the body of the plate. The nut maintains the ring pressing against the tapered surface of the ring which is as such pushed towards the bottom of the groove of the body of the plate. This nut is used solely in order to provide the pressing and the maintaining in position of the ring, and therefore is not solicited for the transmission of the forces transmitted by the blade during operation.

A lock washer can be inserted between the ring and the nut, this washer comprising first means cooperating by shape coupling with means complementary of the body of the plate, and second means cooperating by shape coupling with means complementary of the nut, in order to immobilise in rotation the nut with regards to the plate.

As an alternative, the ring comprises a tapered outer surface that widens towards the exterior and whereon is applied a tapered inner surface substantially complementary of a ring which comprises an internal screw thread on the body of the plate.

Advantageously, the ring comprises a cylindrical edge which extends axially towards the interior in relation to the axis of the recess and which is applied to an outer cylindrical surface of the body of the plate. The ring thus has a substantially L-shaped cross-section, of which a branch is formed by its inner annular portion inserted into the groove of the plate and of which the other branch is formed by the cylindrical edge pressing against the body of the plate. In the case where the centrifugal forces applied to the blade are relatively substantial, the pressing of the inner cylindrical edge of the ring on the outer surface of the body of the plate guaranteeing the maintaining of the inner portion of the ring in the groove of the plate.

In mounted position, the ring is separated by an inner cylindrical surface from the recess by an annular space of which the radial dimension, in relation to the axis of the recess, is determined according to the inner and outer diameters of the ring and of the angular extent of its sectors, in such a way that the inner portion of the ring can be disengaged from the groove of the body of the plate by displacement of the ring sectors in the radial directions towards the exterior in relation to the axis of the recess. The more the ring sectors have a substantial angular extent the more substantial the radial dimension of this angular space is.

The plate is moreover applied on an outer face of the recess of the rotor element by means of another bearing.

This invention further relates to a turbine engine, characterised in that it comprises at least one fan as described hereinabove.

The invention shall be better understood and other details, characteristics and advantages of this invention shall appear more clearly when reading the following description, provided by a way of a non-restricted example and in reference to the annexed drawings, wherein.

Figure 1:
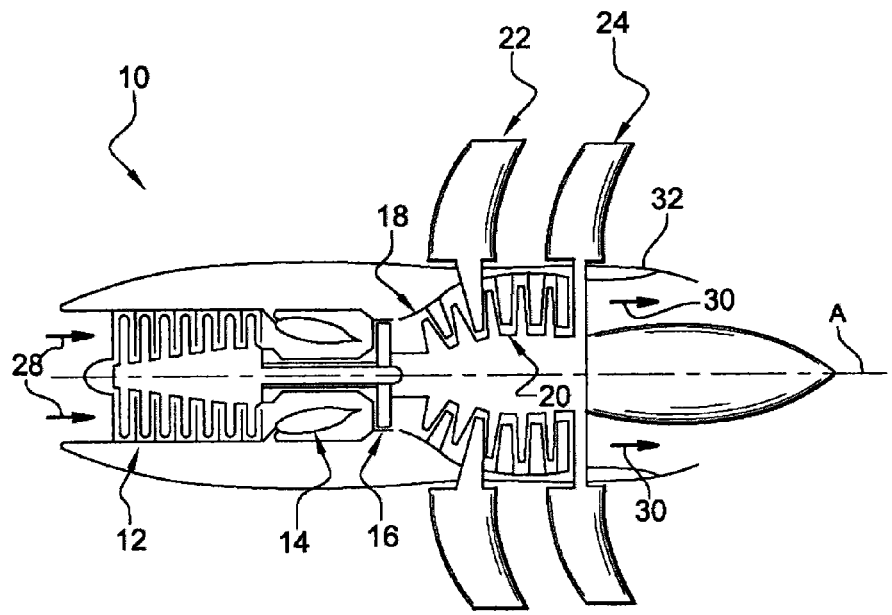
FIG. 1 is a schematic axial cross-section view of a turbine engine with unducted fans.

Reference is first made to FIG. 1 which shows a turbine engine 10 with unducted fans (or "open rotor") which comprises from upstream to downstream, in the direction of the flow of gases inside the turbine engine, a compressor 12, an annular combustion chamber 14, a high-pressure turbine 16, and two low-pressure turbines 18, 20 which are contra-rotating, i.e. they rotate in two opposite directions around the longitudinal axis A of the turbine engine.

Each of these downstream turbines 18, 20 is integral in rotation with an outer fan 22, 24 extending radially to the exterior of the nacelle 26 of the turbine engine, this nacelle 26 being substantially cylindrical and extending along the axis A around the compressor 12, the combustion chamber 14, and turbines 16, 18 and 20.

The flow of air 28 which penetrates into the turbine engine is compressed then is mixed with fuel and burned in the combustion chamber 14, with the combustion gases then passing into the turbines in order to drive in rotation the fans 22, 24 which supply the major portion of the thrust generated by the turbine engine. The combustion gases exiting the turbines are expulsed through a pipe 32 (arrows 30) in order to increase the thrust.

The fans 22, 24 are arranged coaxially behind one another and comprise a plurality of blades that are evenly distributed around the axis A of the turbine engine. These blades extend substantially radially and are of the variable-pitch type, i.e. they can rotate around their axes in such a way as to optimise their angular position according to the operating conditions of the turbine engine.

Figure 2:
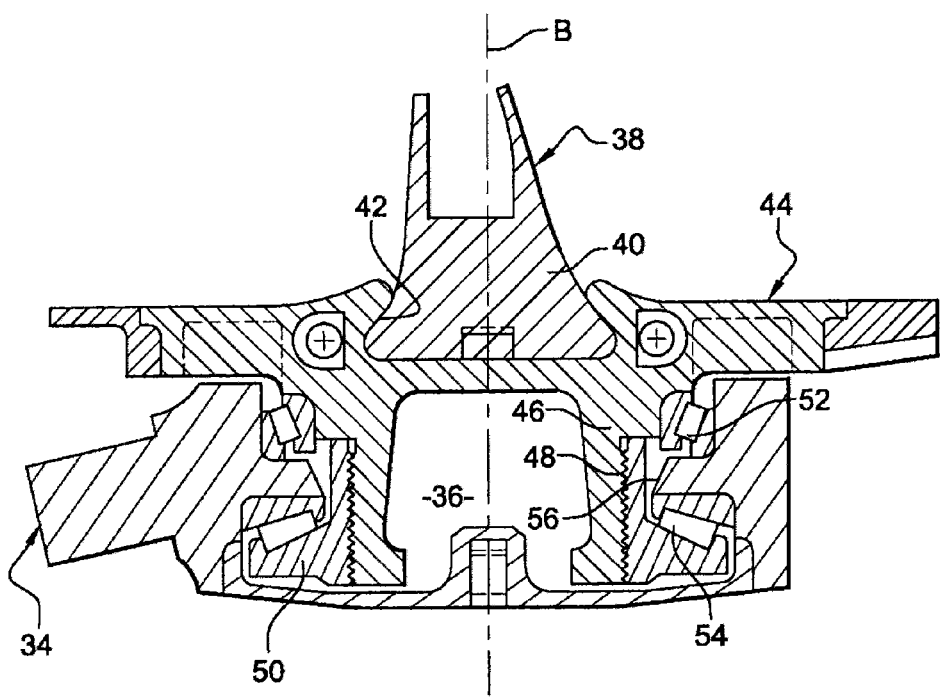
FIG. 2 is a schematic and partial cross-section view of an unducted fan of the prior art, and shows a blade support plate, onto the body of which is screwed a ring centred and guided into a recess of a rotor element of this fan.

In a known assembly shown in FIG. 2 and described in U.S. Pat. No. 5,263,898, each fan comprises a rotor element formed by a polygonal ring 34 which extends around the axis A and which comprises a plurality of substantially cylindrical radial recesses 36 into which are inserted means of mounting blades 38 of the fan.

Each blade 38 comprises at its radially inner end a foot 40 with a section of the dovetail type, which is inserted and held in a groove 42 of a plate 44.

The plate 44 comprises a cylindrical body 46 with external threading 48 for its screwing from the outside into a ring 50 which is inserted into the recess 36 of the polygonal ring 34 from the inside, in relation to the longitudinal axis A of the turbine engine.

The plate 44 and the ring 50 are centred and guided in rotation into the recess 36 by means of two roller bearings 52, 54. The recess 36 of the ring is divided into two portions, respectively radially inner and outer, by an inner annular edge 56 of the ring. A first roller bearing 52 is mounted radially at the exterior of this edge 56, between this edge and the plate 44. The second roller bearing 54 is mounted radially at the interior of the edge 56, between this edge and the ring 50. The plate 44 and the ring 50 are driven in rotation around the radial axis B of the recess 36 by suitable means which are not shown, in order to cause the blade 38 to rotate around this axis and optimise its angular setting.

During operation, the blades 38 are subjected to considerable centrifugal forces (up to 30,000 daN) which are transmitted from the blades to the polygonal ring 34 by means of threadings 48 of the plates and of the rings, which in general are not designed to resist such forces. It would be possible to over-dimension these threadings (so called "buttress thread" thread pitch) so that they can resist these forces but, mechanically, the pressing on threads (regardless of their shape) for the transmission of these forces is not the best solution in order to provide for the longevity and the reliability required of aeronautical parts.

The invention provides a solution to this problem thanks to the sectoring of the ring and the interlocking of the ring sectors in an outer annular groove of the body of the plate.

Figure 3:
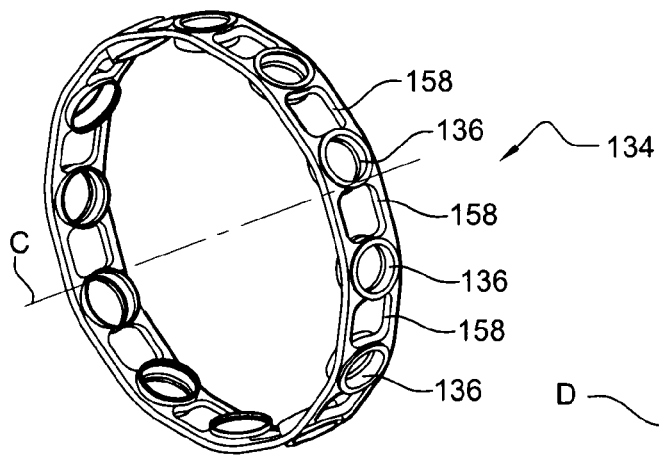
FIG. 3 is a schematic perspective view of a rotor element of a fan according to the invention.
Figure 4:
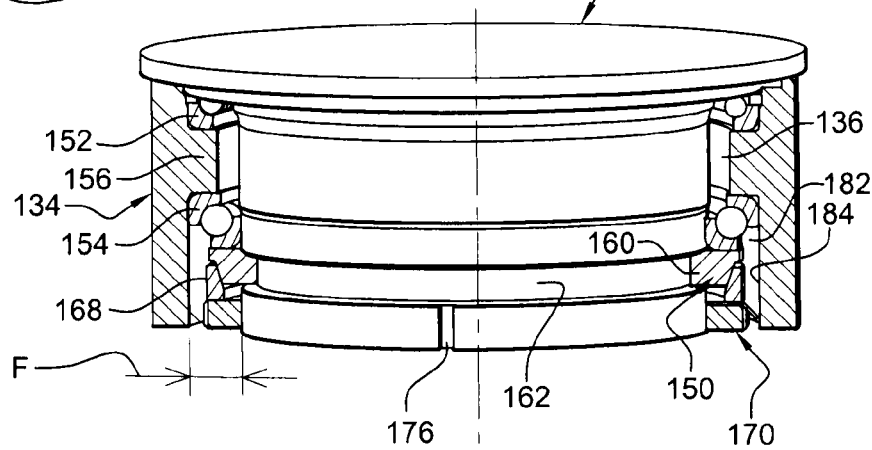
FIG. 4 is a schematic partial perspective view and with a partial removal of the rotor element of FIG. 3, at a higher scale, and in a recess from which are mounted a blade support plate and a ring according to the invention, the ring being sectorized and mounted and fixed onto the body of the plate.
Figure 5:
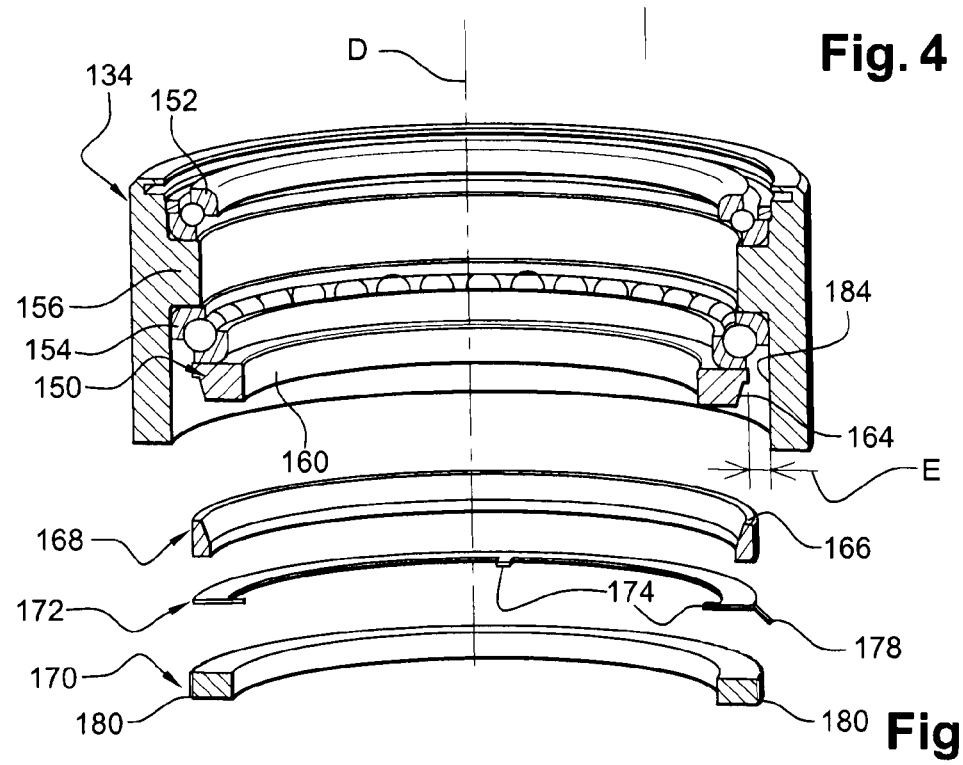
FIG. 5 is a schematic partial view with exploded perspective and with a partial removal of the rotor element and of the ring of FIG. 4, the plate being removed for increased clarity.

FIGS. 3 to 5 show an embodiment of an unducted fan according to the invention, with the blades of this fan not being shown for increased clarity and being mounted on their means of support in the same manner as in the known technique.

The polygonal ring 134 of the fan according to the invention can be seen in full in FIG. 3. It comprises substantially radial cylindrical recesses 136, for example in the number of twelve, in each of which are intended to be mounted a plate and a ring, as shall be explained in more detail in what follows.

The polygonal ring 134 comprises a plurality of recesses 158 that are evenly distributed around the axis C of the ring and formed in the cylindrical wall of the ring in order to lighten it. Each recess 158 is located between two consecutive radial recesses 136.

FIGS. 4 and 5 are partial views on a greater scale of this polygonal ring 134 of which an axial cross-section has been carried out substantially in the middle of a cylindrical recess 136 of the ring.

As in the prior art, the recess 136 of the ring is divided into two portions, respectively radially inner and outer, by an inner annular edge 156 of the ring. A first bearing 152 of the ball type in the example shown is mounted radially at the exterior of this edge 156, between this edge and the plate 144 in order to guide it and centre it in rotation. The second bearing 154 which is also here of the ball type is mounted radially at the interior of the edge 156, between this edge and the ring 150 in order to guide it and centre it in rotation.

The plate 144 is applied on the outer lateral face of the edge 156 by means of the bearing 152 and the ring 150 is applied on the inner lateral face of this edge 156 by means of the bearing 154.

According to the invention, the ring 150 is sectorized and comprises an annular edge 160 which extends radially towards the interior, in relation to the axis D of the recess, and which is inserted by interlocking in an annular groove 162 opening towards the exterior of the body of the plate 144. The mounting of the ring sectors 150 in the groove of the plate shall be explained in detail in what follows.

In the example shown, the ring 150 comprises two sectors of which one can be seen in FIG. 5.

The width or axial dimension (measured along the axis D) of the edge 160 of the ring 150 is greater than or equal to the wide or axial dimension (measured along the same axis) of the groove 162 of the plate 144, in such a way that the edge 160 is inserted into the groove 162 with adjustment at a very low assembly tolerance, and even slightly in force.

The inner diameter of the edge 160 of the ring 150 is furthermore substantially equal to and even less than the inner diameter of the groove 162, in such a way that, in mounted position shown in FIG. 4, this edge 160 is pressing via its radially inner face (in relation to the axis D) against the bottom of the groove 162.

The ring 150 further comprises at its outer periphery a tapered outer surface 164 that widens radially towards the exterior in relation to the axis C of the ring 134, and which cooperates with a tapered inner surface 166 of a shape substantially complementary of a single-piece ring 168 which is solicited towards the exterior (in relation to the axis C) by a nut 170 screwed onto the body of the plate. The ring 168 is as such applied on the ring 150 by the nut 170. The tightening of the nut 170 on the body of the plate 144 drives the sliding of the tapered surface 166 of the ring 168 on the tapered surface 164 of the ring 150 which is then solicited radially towards the interior in relation to the axis D of the recess. This makes it possible to maintain the inner edge 160 of the ring 150 against the bottom of the groove 162 of the plate 144.

A lock washer 172 is inserted between the ring 168 and the nut 170 in order to immobilise in rotation this nut with regards to the plate 144.

This washer 172 comprises at its inner periphery first lugs 174 which are inserted into notches 176 of shape complementary of the body of the plate, in order to immobilise in rotation the washer with regards to the plate. The washer 172 further comprises at its outer periphery second lugs 178 which are intended to be folded back and inserted into notches 180 of shape complementary of the outer periphery of the nut 170, in order to immobilise in rotation the washer on the nut 170.

The washer 172 is inserted into the recess 136 by translation along the axis D, from the inside, and the nut 170 is screwed onto the body of the plate 144 from the inside.

In an alternative not shown, the aforementioned ring and the nut can be formed from a single piece. The ring is then screwed onto the body of the plate and presses via its tapered inner surface against the tapered outer surface of the ring.

The plate 144 and the ring 150 are mounted in the recess 136 of the rotor element 134 in the following manner. The bearing 152 is inserted into the recess 136 from the outside and presses against the outer lateral face of the inner edge 156 of the recess. The plate 144 is aligned on the axis D of the recess then is displaced by translation along this axis from the outside, until its body is inserted into the recess 136 and presses via its radially outer end against the bearing 152. The second bearing 154 is inserted into the recess 136 from the inside and presses against the inner lateral face of the edge 156 of the recess. The ring sectors 150 are inserted one after another from the inside into the annular passage 182 extending between the body of the plate 144 and an inner cylindrical surface 184 of the recess 136 until they are located on the groove 162 of the plate. The surface 184 extends here from the inner edge 156 to the radially inner end of the recess 136. Each ring sector 150 is then displaced in radial translation towards the interior (in relation to the axis D) in such a way that its inner edge 160 is inserted into the groove 162 and presses against the bottom of this groove 162.

The aforementioned annular passage 182 has a radial dimension F (in relation to the axis D) that is sufficient to authorise the insertion of each ring sector 150 by translation from the inside along the axis D. This radial dimension F (FIG. 4) is in particular determined according to the inner and outer diameters of the ring and the angular extent of its sectors. Moreover, in the mounted position of FIG. 4, an annular space is necessary around the ring sectors 150 in order to withdraw the annular edge 160 of the groove 162 by displacing the ring sectors in radial translation in relation to the axis D towards the exterior. The space has a radial dimension E in relation to the axis D (FIG. 5).

In a particular example of an embodiment of the invention, the ring 150 has an inner diameter of 69 mm (corresponding to the inner diameter of its inner edge 160) and an outer diameter of 74.5 mm. When the ring sectors each have an angular extent of 90°, the radial dimension E of the space must be approximately 7.5 mm. When their angular extent is 120°, this dimension E is approximately 10 mm, and when their angular extent is 180°, the dimension E is approximately 28 mm.

In operation, the centrifugal forces to which are subjected the blades of the fan are transmitted to the polygonal ring 134 by means of the plates 144, rings 150 as well as of the bearings 154. The transmission of the forces between the plates and the rings is provided by pressing of the radially inner lateral wall of the groove 162 against the radially inner face of the edge 160 of the ring (in a direction parallel to the axis D), the groove 162 and the edge 160 being designed to resist the aforementioned forces.

Figure 6:
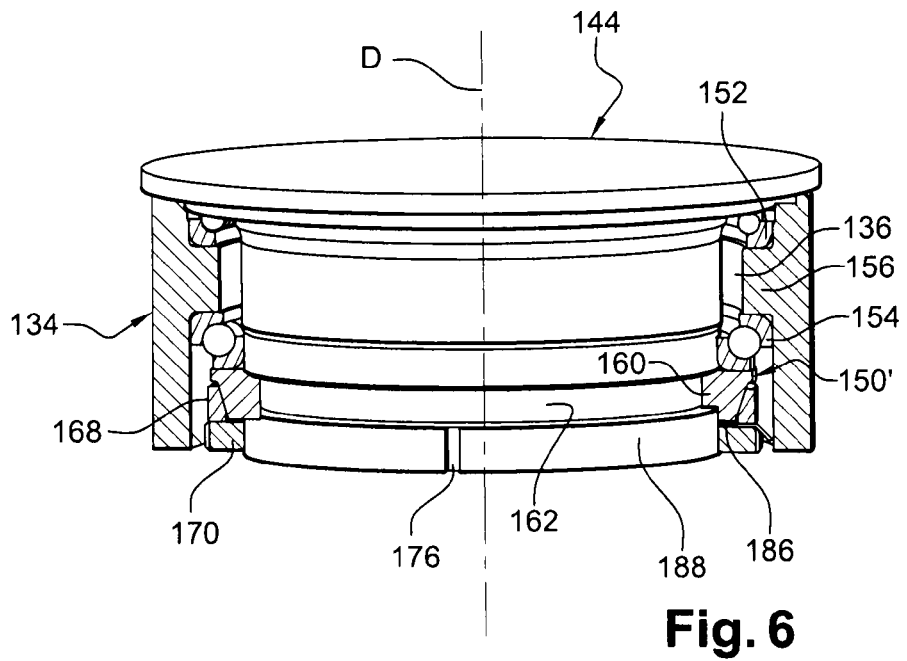
FIG. 6 is a view corresponding to FIG. 4 and shows an alternative embodiment of the invention.
Figure 7:
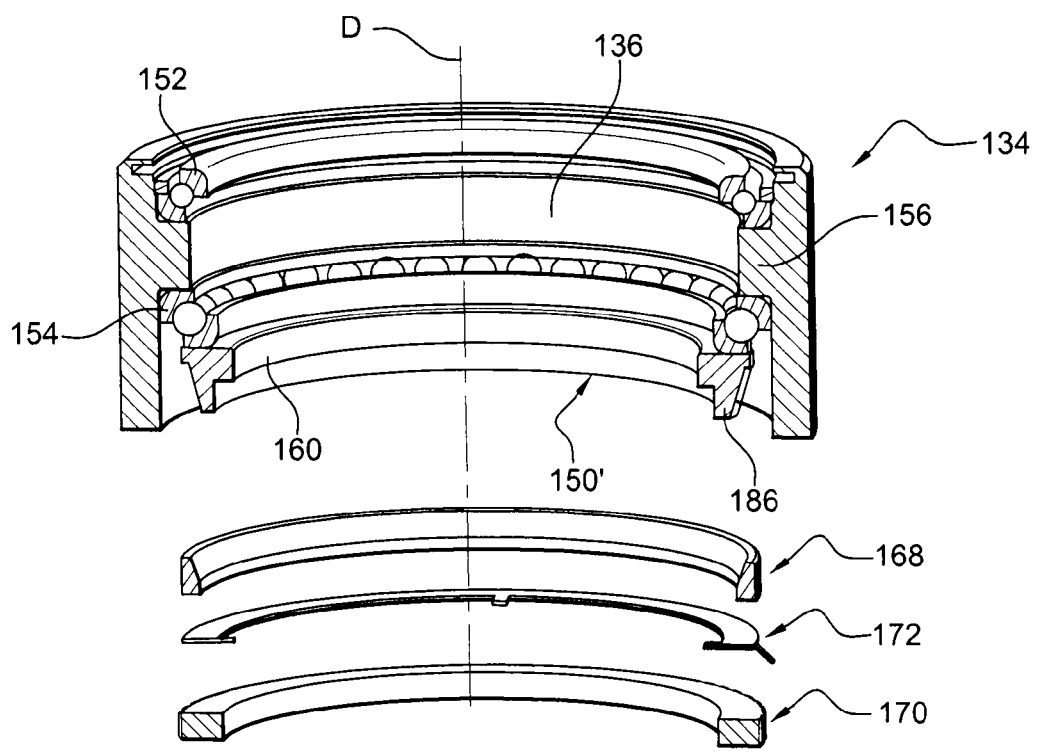
FIG. 7 is a view corresponding to FIG. 5 of the alternative embodiment of FIG. 6.

In the preferred embodiment of the invention shown in FIGS. 6 and 7, only the ring 150 differs from that of FIGS. 4 and 5, this ring further comprising a cylindrical edge 186 extending towards the interior along the axis D. This edge 186 presses via its inner cylindrical surface against an outer cylindrical surface 188 of the body of the plate which extends between the groove 162 and the radially inner end of this body. This pressing makes it possible to maintain in position the inner edge 160 of the ring 150 in the groove 162 of the plate when the centrifugal forces applied to the blade are substantial.

In yet another alternative not shown, the number of ring sectors is equal to three or four, and even more.

The invention claimed is:

1. An unducted fan comprising:
   variable-pitch blades for a turbine engine, the blades of the fan being rotatably mounted about axes thereof in radial recesses of an annular rotor element and each blade being supported by a plate with a cylindrical body that is inserted from an outside into a radial recess of the rotor element and that is held in the recess by an annular ring mounted from an inside in the recess and applied on an inner edge of the recess by a bearing,
   wherein the ring is sectorized and comprises a radially inner portion inserted via interlocking of the ring sectors into an annular groove of an outer surface of the body of the plate.

2. The fan according to claim 1, wherein the ring comprises two sectors each having an angular extent of approximately 180°, or three sectors each having an angular extent of approximately 120°, or four sectors each having an angular extent of approximately 90°.

3. The fan according to claim 1, wherein the radially inner portion of the ring is mounted in the annular groove of the body of the plate with an adjustment at a very low assembly tolerance.

4. The fan according to claim 1, further comprising means for locking the ring in the groove of the body of the plate fixed from the inside of the recess onto the body of the plate.

5. The fan according to claim 4, wherein the means for locking the ring comprises a tapered outer surface that widens towards an exterior and whereon is applied a tapered inner surface substantially complementary of another ring which is inserted from the inside into the recess and which is solicited on the another ring by a nut screwed onto the body of the plate.

6. The fan according to claim 5, further comprising a lock washer inserted between the another ring and the nut and comprising first means cooperating by shape coupling with means complementary of the body of the plate, and second means cooperating by shape coupling with means complementary of the nut, to immobilize in rotation the nut with regards to the plate.

7. The fan according to claim 4, wherein the ring comprises a tapered outer surface that widens towards an exterior and whereon is applied a tapered inner surface substantially complementary of another ring which comprises an internal thread screw on the body of the plate.

8. The fan according to claim 1, wherein the ring comprises a cylindrical edge extending axially towards an interior in relation to the axis of the recess and applied onto an external cylindrical surface of the body of the plate.

9. The fan according to claim 1, wherein, in mounted position, the ring is separated by an inner cylindrical surface of the recess by an angular space of which the radial dimension, in relation to an axis of the recess, is determined according to inner and outer diameters of the ring and angular extent of the sectors, such that the inner portion of the ring can be disengaged from the groove of the body of the plate by displacement of the sectors of the ring in radial directions towards an exterior in relation to the axis of the recess.

10. The fan according to claim 1, wherein the plate is applied onto an outer face of the recess of the rotor element by another bearing.

11. A turbine engine, comprising at least one fan according to claim 1.

* * * * *

UNITED STATES PATENT AND TRADEMARK OFFICE
CERTIFICATE OF CORRECTION

PATENT NO. : 8,827,653 B2  
APPLICATION NO. : 13/258481  
DATED : September 9, 2014  
INVENTOR(S) : Bouru et al.

Page 1 of 1

It is certified that error appears in the above-identified patent and that said Letters Patent is hereby corrected as shown below:

In the Specification

Col. 6, line 42, change "the ring 150" to --the ring 150'--; and

Col. 6, line 65, change "the ring sectors" to --sectors of the ring--.

Signed and Sealed this
Sixteenth Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,827,653 B2  Page 1 of 1
APPLICATION NO. : 13/258481
DATED : September 9, 2014
INVENTOR(S) : Bouru et al.

It is certified that error appears in the above-identified patent and that said Letters Patent is hereby corrected as shown below:

In the Specification

Col. 3, line 46, first occurrence change "the nacelle 26 of" to --the nacelle of--;

Col. 3, line 46, second occurrence change "this nacelle 26" to --this nacelle--; and Col. 6, line 49, change "the ring 150" to --the ring 150'--.

Signed and Sealed this
Twenty-second Day of September, 2015

Michelle K. Lee
*Director of the United States Patent and Trademark Office*